(12) United States Patent
Liebau et al.

(10) Patent No.: US 11,623,516 B2
(45) Date of Patent: Apr. 11, 2023

(54) DEVICE AND METHOD FOR CONTROLLING A DISPLAY DEVICE IN A MOTOR VEHICLE

(71) Applicant: Bayerische Motoren Werke Aktiengesellschaft, Murnchen (DE)

(72) Inventors: Daniel Liebau, Landshut (DE); Claudia Liebau, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 255 days.

(21) Appl. No.: 15/971,734

(22) Filed: May 4, 2018

(65) Prior Publication Data

US 2018/0251031 A1     Sep. 6, 2018

Related U.S. Application Data

(63) Continuation of application No. PCT/EP2016/075345, filed on Oct. 21, 2016.

(30) Foreign Application Priority Data

Nov. 13, 2015   (DE) .................... 10 2015 222 388.4

(51) Int. Cl.
*B60K 35/00* (2006.01)
*B60K 37/06* (2006.01)
(Continued)

(52) U.S. Cl.
CPC ............. *B60K 35/00* (2013.01); *B60K 37/02* (2013.01); *B60K 37/06* (2013.01);
(Continued)

(58) Field of Classification Search
CPC .... B60K 2350/1028; B60K 2350/1044; B60K 2350/1096; B60K 2350/2047;
(Continued)

(56) References Cited

U.S. PATENT DOCUMENTS 5,624,132 A   4/1997   Blackburn et al.
6,483,485 B1  11/2002  Huang et al.
(Continued)

FOREIGN PATENT DOCUMENTS

DE   42 12 018 A1   10/1992
DE   198 24 260 A1  12/1998
(Continued)

OTHER PUBLICATIONS

PCT/EP2016/075345, International Search Report dated May 19, 2017 (Two (2) pages).
(Continued)

*Primary Examiner* — William Boddie
(74) *Attorney, Agent, or Firm* — Crowell & Moring LLP

(57) ABSTRACT

A method for controlling a display device in a motor vehicle includes detecting a person's body posture using sensors that generate corresponding sensor values, and determining, based on the detected sensor values, whether the person is in a normotonic posture. The method also includes determining a distance between the person's eyes and the display device if the person is determined to be in a normotonic posture, and adjusting predetermined display parameters on the display device based on the distance of the person's eyes from the display device.

19 Claims, 2 Drawing Sheets

(51) Int. Cl.
*G02B 27/00* (2006.01)
*G06V 20/59* (2022.01)
*B60K 37/02* (2006.01)
*B60W 40/08* (2012.01)
*B60W 50/14* (2020.01)
*G06V 40/10* (2022.01)
*G02B 27/01* (2006.01)

(52) U.S. Cl.
CPC ....... *G02B 27/0093* (2013.01); *G06V 20/597* (2022.01); *B60K 2370/119* (2019.05); *B60K 2370/148* (2019.05); *B60K 2370/1438* (2019.05); *B60K 2370/151* (2019.05); *B60K 2370/1529* (2019.05); *B60K 2370/182* (2019.05); *B60K 2370/186* (2019.05); *B60K 2370/21* (2019.05); *B60K 2370/333* (2019.05); *B60K 2370/334* (2019.05); *B60K 2370/48* (2019.05); *B60K 2370/52* (2019.05); *B60K 2370/73* (2019.05); *B60K 2370/736* (2019.05); *B60K 2370/739* (2019.05); *B60K 2370/741* (2019.05); *B60K 2370/788* (2019.05); *B60K 2370/794* (2019.05); *B60W 2040/0863* (2013.01); *B60W 2050/146* (2013.01); *G02B 2027/0138* (2013.01); *G06V 40/103* (2022.01)

(58) Field of Classification Search
CPC ........ B60K 2350/352; B60K 2350/901; B60K 2350/903; B60K 2350/2013; B60K 35/00; B60K 35/37; B60K 35/02; G06F 3/011; G06F 3/012; G06F 3/013; G10H 2220/455; G06K 9/00335
See application file for complete search history.

(56) References Cited

U.S. PATENT DOCUMENTS

| | | |
|---|---|---|
| 7,362,887 B2 | 4/2008 | Oohashi et al. |
| 8,401,248 B1 | 3/2013 | Moon et al. |
| 2003/0218719 A1 | 11/2003 | Abourizk et al. |
| 2005/0030322 A1 | 2/2005 | Gardos |
| 2005/0229200 A1 | 10/2005 | Kirkland et al. |
| 2006/0235753 A1* | 10/2006 | Kameyama ........ B60H 1/00742 705/15 |
| 2007/0106172 A1* | 5/2007 | Abreu ................. A61B 5/6821 600/549 |
| 2009/0040196 A1 | 2/2009 | Duckstein et al. |
| 2009/0079765 A1 | 3/2009 | Hoover |
| 2009/0097716 A1 | 4/2009 | Wang et al. |
| 2009/0116735 A1 | 5/2009 | Tsai |
| 2009/0160655 A1 | 6/2009 | Chen |
| 2009/0324024 A1 | 12/2009 | Worthington |
| 2010/0103197 A1 | 4/2010 | Liu |
| 2011/0080290 A1* | 4/2011 | Baxi .................... A61B 5/1116 340/573.1 |
| 2011/0084897 A1 | 4/2011 | Manoharan et al. |
| 2011/0279359 A1 | 11/2011 | McCarty |
| 2012/0075166 A1 | 3/2012 | Marti et al. |
| 2012/0076368 A1 | 3/2012 | Staudacher et al. |
| 2012/0092172 A1 | 4/2012 | Wong et al. |
| 2013/0005443 A1 | 1/2013 | Kosta et al. |
| 2013/0235058 A1 | 9/2013 | Jaramillo et al. |
| 2013/0278496 A1 | 10/2013 | Tsai |
| 2013/0293467 A1 | 11/2013 | Norden |
| 2013/0321617 A1 | 12/2013 | Lehmann et al. |
| 2014/0118354 A1 | 5/2014 | Pais et al. |
| 2015/0192992 A1* | 7/2015 | Di Censo ................ G06F 3/013 345/156 |
| 2015/0304406 A1* | 10/2015 | Penilla .................. G01C 21/26 709/203 |
| 2016/0091969 A1* | 3/2016 | Liu ....................... G06F 1/1637 345/156 |

FOREIGN PATENT DOCUMENTS

| | | |
|---|---|---|
| DE | 103 39 314 B3 | 4/2005 |
| DE | 10 2004 051 159 A1 | 9/2005 |
| DE | 10 2004 057 013 A1 | 6/2006 |
| DE | 10 2006 011 233 A1 | 9/2007 |
| DE | 10 2007 023 141 A1 | 11/2008 |
| DE | 10 2011 114 074 A1 | 3/2013 |
| DE | 10 2012 201 805 A1 | 8/2013 |
| DE | 20 2013 002 800 U1 | 9/2013 |
| EP | 2 515 526 A2 | 10/2012 |
| EP | 2 573 696 A2 | 3/2013 |
| WO | WO 99/21356 A1 | 4/1999 |
| WO | WO 2007/102053 A2 | 9/2007 |

OTHER PUBLICATIONS

German Search Report issued in German counterpart application No. 10 2015 222 388.4 dated Aug. 2, 2016, with Statement of Relevancy (Nine (9) pages).

* cited by examiner

DEVICE AND METHOD FOR CONTROLLING A DISPLAY DEVICE IN A MOTOR VEHICLE

CROSS REFERENCE TO RELATED APPLICATIONS

This application is a continuation of PCT International Application No. PCT/EP2016/075345, filed Oct. 21, 2016, which claims priority under 35 U.S.C. § 119 from German Patent Application No. 10 2015 222 388.4, filed Nov. 13, 2015, the entire disclosures of which are herein expressly incorporated by reference.

BACKGROUND AND SUMMARY OF THE INVENTION

The invention relates to an apparatus and a method for controlling a display device in a motor vehicle.

US 2005/0030322 A, US 2005/0229200 A1, US 2009/0079765 A1 and US 2010/0103197 A1 disclose apparatuses and methods for changing a display size of an object depicted on a display device, for adapting a display content and a size of depicted information, for altering the size of a depicted screen content on the basis of a distance of a viewer from the display device or for adapting a font size on a display device on the basis of distance, wherein a viewer prescribes font sizes for different distances from a display device.

EP 2 515 526 A2 describes a display apparatus with image capture and analysis for detecting a face of a viewer, wherein a face size is used to perform an estimation of a distance between the viewer and the display apparatus and this distance is taken as a basis for automatically adapting a size of font, making user-specific settings and/or performing an ergonomic analysis.

US 2013/0278496 A1 discloses an apparatus and a method for selecting a user interface or the level of detail for depicted information thereon and the display size of said information on the basis of a distance of a viewer from a display device depicting the user interface.

DE 10 2004 057 013 A reveals an apparatus and a method for processing and for displaying a video signal on a display device, wherein a distance detection device is used to monitor a prescribed area in front of the display device for objects that are present, such as, for example, a viewer, and a distance of such objects is used in the signal processing of the video signal.

WO 99/21356, DE 198 24 260 A1, US 2009/0097716 A1 and US 2009/0160655 A1 describe methods and apparatuses for measuring the distance of a viewer from a display device, wherein the viewer is informed of an optimum viewing distance by means of a display, a warning signal is output to the viewer if he is closer than a previously defined distance or an alarm signal is output and/or a power supply for the display device is disconnected if the viewer is present within a predetermined distance range in front of the display device when a predetermined period of time is exceeded.

US 2009/0116735 A1 discloses a warning method for avoiding eye stress in a computer user, wherein a degree of eye opening and a viewing time are ascertained from an image sequence on the basis of different features of a face of the computer user.

U.S. Pat. No. 6,483,485 B1 discloses a method and an apparatus for protecting and looking after eyes of a person viewing a display device, wherein the brightness, contrast, colors and clarity of the font of the display device are adapted on the basis of a distance from the display device, a level of strain and an ambient brightness and a warning is output if the ambient brightness, the level of fatigue and/or the distance from the display device is/are exceeded.

US 2011/0084897 A1 describes an apparatus in which the distance of a user from a display device is taken as a basis for changing the size of a font or a graphical object, wherein eye gestures of the user are captured and an eye strain of the user is inferred therefrom.

US 2012/0092172 A1 divulges a method for detecting at least one strain in a viewer of a display device, e.g. an eye strain, a neck strain or a back strain, wherein a strain in the viewer is inferred from a head position and a viewing time.

US 2003/0218719 A1 reveals a method and an apparatus for determining a level of drowsiness of a person, wherein an eye of the person is scanned by means of infrared light in order to perform explicit identification of the person on the basis of the scanned iris of the eye and to infer the drowsiness of the person from changes in a pupil size over a period of time.

US 2013/0321617 A1 and US 2014/0118354 A1 describe apparatuses and methods for capturing a distance between a display device and a user and for adapting a font size of an information content depicted on the display device on the basis of the captured distance, wherein a prescription for a vision aid for the user or the presbyopia of said user can be taken into consideration as well.

EP 2 573 696 A1 discloses an apparatus and a method for assisting a user in adopting a correct viewing position for a portable display device, wherein a cervical spine position relative to the display device is determined and a warning is output if the viewing position is not correct.

US 2009/0324024 A1 describes an apparatus and a method in order to monitor a body posture of a viewer of a display device, wherein face recognition is used to detect a previously stored correct body posture and the viewer is informed about a correct body posture being present.

US 2011/0080290 A1 discloses apparatuses and methods for establishing whether a body posture of a viewer of a display device is in an ergonomic reference range, and for asking the user to adopt an ergonomic body posture, and for setting the display device, so that the body posture of the viewer is in the ergonomic reference range.

US 2012/0075166 A1 reveals a method and an apparatus for automatically altering a position of one or more elements of a display device, wherein the position alteration is performed on the basis of a movement and/or a body posture of a viewer of the display device.

DE 10 2006 011 233 A1 divulges an apparatus and a method for optimizing an image depiction on a display device if a viewer looks at the display device, wherein an ambient brightness and/or a contrast of the display device are changed.

US 2013/0293467 A1 describes an apparatus for determining which single user of multiple different potential users performs an input on an apparatus by means of a single input appliance, wherein lines of vision of the users in relation to the apparatus are captured and evaluated.

US 2013/0005443 A1 divulges various methods and apparatuses for face recognition on the basis of facial features, for detection of a facial expression and/or for detecting eye movements by means of eye tracking.

DE 10 2004 051 159 A1 and US 2012/0076368 A1 disclose apparatuses and methods for identifying a person on the basis of a face of the person that is detected in an image, wherein pupils and eyebrows of the face are provided with reference points, and distances between these reference points are taken into consideration for the identification, or on the basis of changes occurring at facial features, for example as a result of facial expressions, in a face detected in a series of single images.

U.S. Pat. No. 8,401,248 B1 reveals a method and an apparatus for measuring emotional and attentiveness reactions of a person to dynamically changing digital media contents, wherein a facial expression and a line of vision of the person are evaluated.

US 2011/0279359 A1 discloses apparatuses and methods for detecting patterns in sensor signals that identify a state of frustration of a user, and for setting interaction modes on a display device, wherein the state of frustration is taken into consideration.

WO 2007/102053 A2 describes an apparatus and a method for determining a human emotion by analyzing a combination of properties of the eyes, such as e.g. pupil size, blinking, eye position, wherein a distinction is drawn between positive, neutral and negative emotional reactions.

US 2013/0235058 A1 divulges a method for stipulating display parameters for a display device on the basis of a distance of the display device from a viewer, wherein environment-specific, information-content-specific and/or user-specific parameters that are used to take into consideration a behavior of the user when viewing the display device are included as well and changes to these parameters result in adaptation of the depiction on the display device.

An object of the invention is providing a method and an apparatus for controlling a display device in a motor vehicle, so that fatigue in a person viewing the display device is kept as low as possible.

A further object is to provide a method and an apparatus for controlling a display device in a motor vehicle, so that the display device allows fatigue-free and relaxed viewing by a person.

In one embodiment, a method for controlling a display device in a motor vehicle comprises the steps of:
capturing a body posture of a person by means of sensors that generate applicable sensor values,
ascertaining on the basis of the captured sensor values whether the person is in a normotonic body posture,
determining a distance between eyes of the person and the display device by means of at least one sensor if this person is in a normotonic body posture,
setting predetermined display parameters on the display device on the basis of this distance between the eyes and the display device.

Within the context of the invention, in a motor vehicle means in a passenger compartment or in a vehicle interior.

According to the invention, there is therefore provision for the body posture of the person to be captured and, in the event of a normotonic body posture, for the distance of the person from the display device to be taken as a basis for setting predetermined display parameters.

The display parameters predetermined for setting on the display device are chosen for the respective distance from the display device such that a piece of information depicted on the display device becomes more easily readable or capturable. This improved readability or capturability ensures that the person can discern the depicted content easily and efficiently.

The readability in this case relates to both readability of a piece of information to be displayed as text and detectability or discernability of other graphical information, such as e.g. symbols, images, etc. The readability in this case is dependent on a size of a depicted piece of information, for example, the size of information or of display parameters meaning the actual dimensions of a displayed object, such as a text, image, symbol or area. The size of displayed objects is dependent on a set scaling factor in this case, wherein the readability correlates with this scaling factor. The scaling factor indicates the level of magnification or of reduction of displayed objects.

Furthermore, there is no need for the person to change his body posture or to leave an adopted normotonic body posture in order to be able to read display content better. Since the display device is already easily readable, the person is prompted to continue to adopt a normotonic body posture.

The easier and more efficient discernment of the depicted content decreases a strain in the person viewing the display device. This lower strain keeps fatigue in the person as low as possible and hence allows fatigue-free viewing of the display device.

In the context of the present invention, a normotonic body posture is understood to mean body posture in which a strain in skeletal muscles intended for moving extremities of a person is in a range between a hypertonic state, in which the skeletal muscles are very tense, and a hypotonic state, in which the skeletal muscles are completely relaxed and/or limp.

Fundamentally, the person can adopt a multiplicity of different body postures that often differ only marginally. On account of these small differences, these different possible body postures can expediently be assigned to different ranges of body postures, namely one or more hypertonic ranges, one or more hypotonic ranges and one or more normotonic ranges.

Normotonic body postures are distinguished in this case by virtue of essential features being fulfilled, such as, for example, an approximately uniform weight distribution around a center of gravity of the person and an approximately erect sitting position with an approximately straight spinal column, the person being in contact with or resting against a backrest.

The uniform weight distribution and the approximately straight spinal column in the erect sitting position avoid one-sided twisting of the body or of extremities, which can lead to tension in the skeletal muscles, and a weight shift that would need to be compensated for by straining skeletal muscles in order to keep the body in a stable sitting position. Resting against the backrest likewise causes the skeletal muscles to relax.

Strain or tension often leads to fatigue. In a normotonic body posture of this kind, the lack of tension or lack of strain in the skeletal muscles therefore means that no symptoms of fatigue can be expected.

On the other hand, in a normotonic body posture, there is no maximum relaxation of the skeletal muscles through complete relaxation of the body. The reason is that complete relaxation of this kind is an indication that the person is in a state immediately before falling asleep or is even sleeping. In such a state, there is a lack of attentiveness in the person, owing to tiredness or sleep. There is also the possibility of the relaxation of the skeletal muscles meaning that a body posture is adopted in which the body or the extremities thereof no longer has/have a uniform weight distribution around a center of gravity of the person and an approximately erect sitting position with an approximately straight spinal column. When a "crooked" body posture of this kind is adopted for a relatively long time without alteration, this can lead to tension in the skeletal muscles.

In this respect, a normotonic body posture is a body posture in which there is not complete relaxation of the skeletal muscles and there is a certain level of attentiveness in the person.

For a normotonic body posture, a level of normotonia can be determined by virtue of features that define a normotonic body posture being weighted according to predetermined rules and these weighted features being combined with one another.

The sensors for capturing the body posture capture one or more of the features explained above for a normotonic body posture, namely the weight distribution, for example using pressure values, and/or the position or orientation of the body and its extremities, for example using a camera image or using three-dimensional data.

The evaluation of these sensor data or sensor values allows an adopted body posture to be detected as a normotonic body posture, said normotonic body posture to be assigned to a normotonic range and/or said normotonic range to be assigned a level of normotonia.

The sensors for capturing a body posture and further sensors for determining a normotonic body posture are explained in yet more detail below.

The display device may be a screen that is arranged in a motor vehicle, so that it can be viewed by a driver and/or a passenger. Such a display device may be arranged in a rear of an automobile seat or of a headrest, in a center console, in an armrest, in a vehicle door, in an interior lining (e.g. integrated foldably in the roof lining or in an A/B/C/D pillar, etc.) or in a cockpit, preferably in a dashboard, of the vehicle. The display device arranged in the rear of one of the automobile seats or one of the headrests can be viewed by a person sitting in the back of the motor vehicle in this case.

The display device can moreover comprise a speedometer or a tachometer display, a combined instrument, a multi-function display or a head-up display.

The display device may be configured in the form of multiple display devices arranged at different positions in the motor vehicle.

According to a further aspect of the present invention, a method for controlling a display device in a motor vehicle comprises the following steps:
- capturing biometric data of a person by means of sensors,
- creating a profile of preferred display parameters for this person,
- storing the captured biometric data of this person and the profile of the preferred display parameters in combination in order to actuate the display device in accordance with the preferred display parameters.

In this case, automatic assignment of preferred display parameters to a person on the basis of biometric data in a motor vehicle is possible. This allows a person to stipulate the display parameters he prefers during an initial configuration.

Storing the captured biometric data of a person and the profile of the preferred display parameters in combination means that the preferred display parameters are assigned to this person and can be set on the display device automatically if this person is recognized during renewed identification.

The method for controlling a display device in a motor vehicle may be configured such that a profile of preferred display parameters for the person is created by displaying different display images on the display device and capturing a response of the person.

This provides the opportunity to present the person with different display images from which the person can quickly and efficiently select the preferred display image. In this case, the different display images have different display parameters. The selection from different display images simplifies profile creation for the preferred display parameters considerably.

Different display images can be displayed on the display device by altering the display parameters.

The alteration of the display parameters can be carried out by the person or automatically when the method is carried out. This allows individual display parameters to be altered selectively, manually or automatically and allows the profile of the preferred display parameters to be individually matched to the preferences of the person for each display parameter.

The capture of the response can be performed by means of an input on an input device and/or by virtue of a body posture of the person being captured by means of sensors that generate applicable sensor values. The input device may in this case be configured as a keypad, one or more control knobs, a touch sensitive screen and/or a microphone for a voice input.

An input on the input device, which is configured as a keypad, one or more control knobs or as a touch sensitive screen, can be used to effect the response with little technical complexity.

A response by means of voice input ensures that the person continues to be in his chosen sitting position or adopted body posture, since he does not have to move to operate a keypad, control knobs or a touch sensitive screen.

The capture of a body posture of the person by means of sensors allows the response of the person to amended or changing display parameters to be captured automatically. If e.g. the display device is readable or discernable only poorly or less than optimally for a particular setting of a display parameter, then it is possible for the person's leaning forward to be able to read the display device more easily to be detected.

Additionally, the dwell time for which the person is in a particular posture can be measured, for example in order to distinguish fidgeting on or straightening in the automobile seat, which often lasts a few seconds, from a longer-lasting sitting or support position.

From the respective behavior of the person, it is therefore possible to infer the readability of the display for the currently set display parameters. This allows errors during the automatic alteration of display parameters to be minimized and the creation of the profile of the preferred display parameters to be performed more efficiently, more accurately and more conveniently.

Therefore, the capture of the response of the person allows currently set display parameters to be confirmed as preferred display parameters.

Moreover, it is possible to monitor whether the person adopts a normotonic body posture. If this is the case, then the profile of the set display parameters can be stored in combination with the captured biometric data of this person.

Monitoring whether the person adopts a normotonic body posture allows the currently set display parameters when this normotonic body posture is adopted to be stipulated as the display parameters that allow the person to adopt a normotonic body posture with simultaneously improved readability of the display device. This ensures that the preferred display parameters are those that allow the person to adopt a normotonic body posture and hence to view the display device in a fatigue-free and relaxed manner.

Moreover, the method may be configured such that monitoring is carried out to determine whether the person adopts a normotonic body posture, and if this is the case then a level of normotonia of the body posture can be ascertained. The profile of the set display parameters can be stored in combination with the captured biometric data of this person together with this level of normotonia only if the level of normotonia exceeds a previously stored level of normotonia of another profile of display parameters of this person or no other profile of display parameters of this person has previously been stored.

As a result, when a body posture that is more normotonic, i.e. that has a higher level of normotonia, than a previously adopted body posture is adopted, the set display parameters are automatically stored for this person. Therefore, by repeatedly altering his position, the person can attempt to adopt a body posture that is as normotonic as possible and the display parameters for this body posture are accordingly available in stored form.

If there are no display parameters available for this person, however, and a normotonic body posture is detected, then display parameters for this person are stored automatically as an initial configuration.

When the method is carried out, a distance between eyes of the person and the display device can be determined by means of at least one sensor, and the distance can be stored in combination with the biometric data of the person and the profile of the preferred display parameters.

As a result, a piece of distance information is stored for the preferred display parameters of the person, so that this piece of distance information can be taken into consideration as well for a later setting process for display parameters. This improves the accuracy with which display parameters can be set on the display device, as explained later on.

The method can moreover comprise the steps of:
capturing biometric data of a person by means of sensors and identifying this person on the basis of the previously stored biometric data,
determining a current distance between eyes of the identified person and the display device by means of at least one sensor,
adapting the display parameters stored in combination with the biometric data of the identified person on the basis of a disparity between the stored distance and the current distance and setting the display parameters matched to the current distance on the display device.

As a result of the capture of biometric data, the display parameters linked to the person can be read during detection or during identification of the person, so that these display parameters can be processed further. By way of example, an already identified person can be detected if the person gets into the motor vehicle or starts up the display device in order to have information displayed on the display device.

Determining the current distance of the eyes from the display device, ascertaining the disparity from the stored distance which the person had used to set the preferred display parameters and adapting the display parameters used for setting the display device on the basis of the disparity allow these display parameters to be set optimally for the current distance. The display parameters set for the person are therefore based on the preferred display parameters of said person, but are adaptable to suit the current distance from the display device. This can relate, by way of example, to display parameters that define a font style, a resolution, a scaling factor and/or a size of a display area, of an image, of a font, of a symbol and/or of a display window. If the eyes of the person are currently closer to the display device than the stored distance, then the scaling factor can be reduced, for example, so that the displayed objects become smaller, but at the same time possibly more objects can be displayed on the display device. If the eyes are currently further away than the stored distance, on the other hand, then the scaling factor can be magnified, so that the size of the displayed objects increases, in which case possibly fewer objects are displayable.

Alternatively, the method for controlling the display device in a motor vehicle can moreover comprise the steps of:
capturing biometric data of a person by means of sensors and identifying this person on the basis of the previously stored biometric data,
automatically setting the display parameters linked to the biometric data of the identified person on the display device.

As a result, the display parameters linked to the person can be automatically set on the display device during detection or during identification of the person. An already identified person can be detected, for example, if the person gets into the motor vehicle or starts up the display device in order to have information displayed on the display device.

The sensors for capturing biometric data can comprise a camera, a laser scanner, an ultrasonic appliance, a radar appliance and/or a microwave appliance for capturing a face geometry, an ear geometry, a body shape, a body contour and/or a body size, a camera and/or a laser scanner for capturing an iris and/or a retina, a microphone for detecting a voice, a pressure sensor for capturing a weight and/or a fingerprint sensor for capturing a fingerprint.

Since a motor vehicle is often used only by a few different people, capture and evaluation of simple biometric data, such as e.g. the weight of a person, already allows efficient identification of the respective person.

The camera may in this case be configured in the form of a single camera module or multiple single camera modules. Likewise, the camera may be a stereo camera or a time-of-flight camera, so that distance measurement is also possible.

According to a further aspect of the present invention, a method for controlling a display device in a motor vehicle comprises the steps of:
monitoring a distance between eyes of a person and a display device and/or monitoring a body posture of a person,
adapting display parameters according to the captured distance and/or the captured body posture.

The monitoring of the distance between the eyes of the person and the display device and adaptation of display parameters ensure that the person can read the display device in fatigue-free and relaxed fashion. Alternatively or additionally, the body posture of the person can be monitored in this case, so that the depiction on the display device can be adapted such that optimum readability of the display device is ensured for the person in his respective body posture.

The set display parameters can in this case be altered such that the person is influenced so as to adopt a normotonic body posture.

As a result, a person can be motivated to adapt his body posture such that he adopts a normotonic body posture and can therefore view the display device in fatigue-free and relaxed fashion.

Moreover, monitoring can be carried out to determine whether the person adopts a normotonic body posture. If this adoption of a normotonic body posture is established, the amended display parameters can be stored as set display parameters.

This allows a check to determine whether the person has adopted a normotonic body posture after a change of display parameters. If this is the case, the amended display parameters are confirmed as a setting for the display device.

However, it may also be that, after a change of display parameters, it is established, for example after a predetermined waiting time has elapsed, that the person has not adopted a normotonic body posture or has not altered his body posture. In such a case, other display parameters for another normotonic body posture can be set in order to continue to influence the person to change his body posture to a normotonic one. Alternatively, it is possible for active changing of the display parameters to be blocked and to return to the original display parameters, this blockade being able to be maintained for a predetermined waiting time. This serves to avoid stress through repeated or rapidly successive changes to the display parameters for a person who clearly does not want to adopt a normotonic body posture.

It is also possible for parameters of a seat setting or sitting position in which the person can or could adopt a normotonic body posture to be stored in combination with the biometric data of the person. These parameters have previously been captured and stored as well during the initial configuration, for example.

If the automobile seat is moved from this sitting position when the person gets in, automatic return of the automobile seat to this stored sitting position allows a normotonic body posture of the person to be achieved more quickly.

Such a return of the automobile seat can be triggered, by way of example, when the person switches on the display device to which the seat setting corresponds, or requests information that needs to be depicted on this display device.

In order to ascertain whether the person has a normotonic body posture, suitable sensors can be used to determine a weight distribution and/or a body posture of the person. This weight distribution and/or this body posture can be taken as a basis for assessing whether the person adopts a normotonic body posture.

The sensors for determining the weight distribution may be configured as at least two pressure sensors that are arranged in an automobile seat, a seating surface, backrest, headrest, center console, armrest, interior lining, lower-leg support, footrest and/or in a floor area of the motor vehicle.

In this case, the floor area in the motor vehicle comprises an inner floor, a floor covering, such as a mat or a carpet, for example, and the area for pedals onto which feet can be placed.

The more pressure sensors for which provision is made, the more accurately a weight distribution can be ascertained, since the distribution of a contact pressure and hence of a weight can be determined more accurately over a multiplicity of pressure sensors than when there are only a few pressure sensors. The distribution or the arrangement of the pressure sensors in supporting surfaces on which body parts of the person are supported can be taken into consideration as well in this case for the determination of the weight distribution.

The sensor for determining the body posture can comprise a camera, a laser scanner, a radar appliance, an ultrasonic appliance and/or a microwave appliance. Such a sensor captures the person, and the sensor values are supplied to an evaluation, so that a body posture of the person can be extracted from the sensor values.

To assess whether the person is in a normotonic body posture, further sensor values can be captured and taken into consideration. In this case, a camera can be used to capture at least a face of the person and a facial expression of the person can be extracted from the camera data. A level of relaxation of the person can be determined on the basis of the facial expression, the person having a high level of relaxation in a normotonic body posture. It is also possible for a camera to be used to capture at least an eye area of the person. An eye geometry of the person can be extracted from the camera data and a degree of eye opening and/or an eye strain of the person can be determined on the basis of the eye geometry. In this case, the person has an average degree of eye opening and/or a low eye strain in a normotonic body posture. It is also possible for a camera, a laser scanner, a radar appliance, an ultrasonic appliance and/or a microwave appliance to be used to determine a breathing rate of the person. A level of relaxation of the person can be determined on the basis of the breathing rate, the person having a low breathing rate and hence a high level of relaxation in a normotonic body posture. Likewise, a heart rate monitor that is configured as a pulsimeter, a radar appliance, an ultrasonic appliance and/or a microwave appliance can be used to determine a pulse of the person. A level of relaxation of the person can be determined on the basis of the pulse, the person having a low pulse and hence a high level of relaxation in a normotonic body posture.

The involvement of further sensor values in the assessment of whether the person is in a normotonic body posture allows the presence of a normotonic body posture to be determined with greater accuracy than is possible by means of the determination of the weight distribution and/or of the body posture alone.

The display parameters settable on the display device comprise a brightness, a contrast, a color, a color scheme, a color temperature, a resolution, an image size, a font size, a font style, a symbol size, a display area size, a display window size, a display window arrangement, a scaling factor and/or a selection of displayed information from potentially displayable information.

Varying these display parameters allows readability to be increased and hence fatigue-free viewing of the display device to be achieved.

The selection of the displayed information from the potentially displayable information allows the volume of information depicted on the display device to be decreased, so that magnification of the respective displayed information for a given screen size or resolution is possible. Such a magnification increases the readability of the displayed information.

Font size is a particular form of image size in this case, since the font size correlates with the number of image points being used at the respective resolution.

When at least one further display device is present, the distances between the eyes of the person and each further display device can be determined. A piece of information to be displayed can be distributed between the different display devices according to predetermined rules and/or on the basis of the distance between the eyes and the respective display device.

As a result, the piece of information to be displayed can be distributed such that different components of this information are depicted on different display devices. A reduced volume of information to be displayed means that this allows said information to be depicted on the respective display device in magnified fashion, so that readability can be improved.

The distribution of the information to be displayed over different display devices can be effected, and performed automatically, on the basis of an information content, an information type, a relevance of the respective information, according to a predetermined priority of available display devices and/or the technical properties or technical limitations thereof in this case. It is also possible for preferences for distribution of the information to be prescribed by the person viewing.

As a result, the respective information to be displayed can be depicted on the different display devices with optimum readability.

A sensor for determining the distance between the eyes of the person and the display device may be configured as a stereo camera, a time-of-flight camera, a laser scanner, a radar appliance, an ultrasonic appliance and/or a microwave appliance in this case.

These sensors can likewise be used to determine whether a normotonic body posture is present, as explained above. As a result, sensors already intended for determining the body posture can also be used to determine distance.

According to a further aspect of the present invention, an apparatus for controlling a display device in a motor vehicle comprises a control device that is connectable to a display device and to sensors. In this case, the control device is configured to carry out one or more methods in combination with one another, as are explained above.

The apparatus and the methods can also be used and carried out independently of the motor vehicle or outside the motor vehicle, for example at an office workstation.

Other objects, advantages and novel features of the present invention will become apparent from the following detailed description of one or more preferred embodiments when considered in conjunction with the accompanying drawings.

DETAILED DESCRIPTION OF THE DRAWINGS

An exemplary embodiment of an apparatus for controlling a display device, which is subsequently referred to as display control apparatus 1, in a motor vehicle is explained below.

Figure 1:
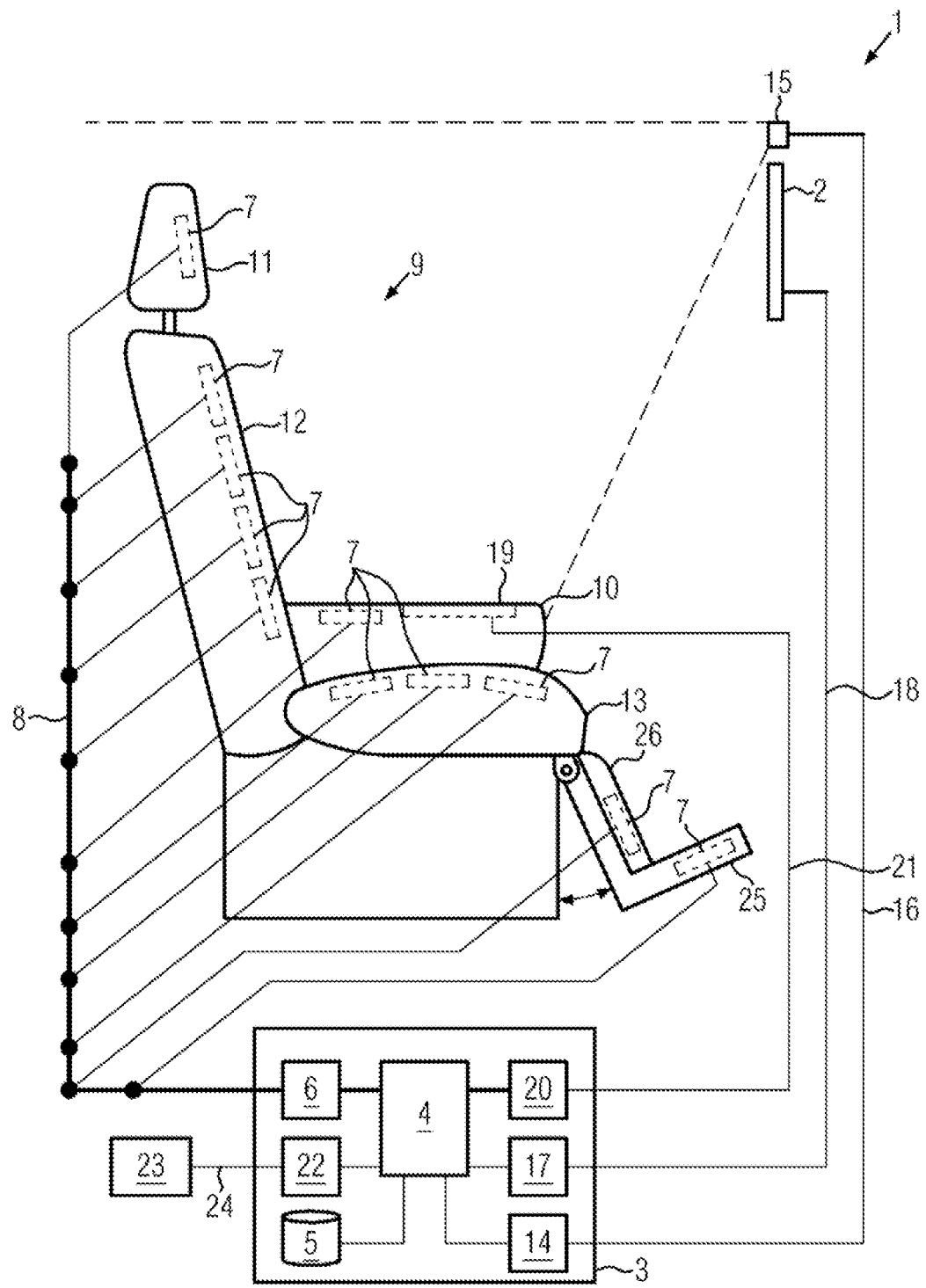
FIG. 1 shows an apparatus for controlling a display device in a motor vehicle.
Figure 2:
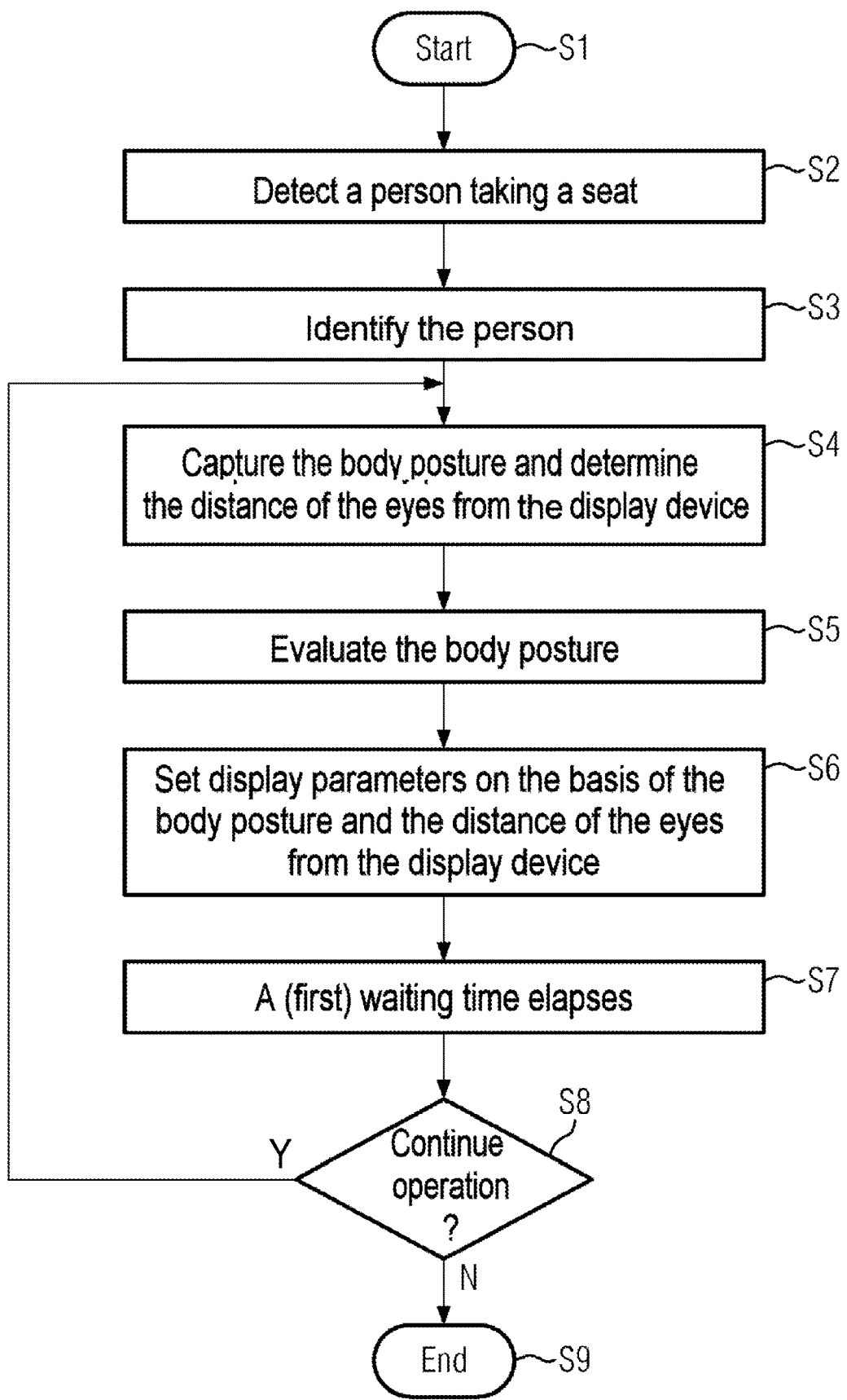
FIG. 2 shows a method for capturing a body posture and for evaluating whether the body posture is a normotonic body posture.

A motor vehicle (not shown) is provided with the display control apparatus 1, which uses suitable sensors to capture a body posture of a person, rates the body posture and controls a display device 2 on the basis of the rating, with predetermined display parameters being set on the display device 2 (FIG. 1).

The display control apparatus 1 has a control device 3 that is connected to the display device 2. The control device 3 is configured as a computer having a CPU memory device and suitable interfaces that controls the display control apparatus 1 centrally.

The control device 3 comprises a microprocessor 4 on which a computer program is executable and is executed that provides the functionality of the control device 3.

The microprocessor 4 is connected to a memory device 5 for storing data. In this case, these data comprise profiles of preferred display parameters, biometric data of people, distribution functions, threshold values for the assessment of the body posture of a person on the basis of a weight distribution, rules for setting predetermined display parameters on the display device 2, standard values for display parameters, image data of a captured person and/or information to be displayed.

Moreover, the microprocessor 4 is connected to a pressure sensor interface 6 via which the microprocessor 4 receives sensor values from pressure sensors 7.

In this case, the pressure sensors 7 are connected to the pressure sensor interface 6 via a bus connection 8. The pressure sensors 7 are arranged in an automobile seat 9, in a center console 10 adjacent to the automobile seat 9, in an armrest (not shown) integrated in a door interior lining (not shown). The automobile seat 9 has multiple pressure sensors 7, while the center console 10 and the armrest each have one pressure sensor 7. The pressure sensors 7 can be used to measure or capture an application of pressure. These pressure data are forwarded as electrical signals to the control device 3 via the bus connection 8.

The automobile seat 9 has a headrest 11, a backrest 12, a seating surface 13 and a movable footrest 25 with an integrated lower-leg support 26. The pressure sensors 7 are distributed in these components of the automobile seat 9 such that the body posture of a person sitting on the automobile seat 9 can be determined as accurately as possible on the basis of the distribution of the captured pressure data. In this case, multiple pressure sensors 7 are arranged in the seating surface 13, since the main component of the weight of the sitting person is loaded on the seating surface 13. The headrest 11, on the other hand, has only one pressure sensor 7 arranged in it, since this pressure sensor 7 merely detects the presence or contact of a head of the sitting person. The backrest 12 again has multiple pressure sensors 7 in order to be able to assess the body posture of the sitting person as accurately as possible on the basis of the weight distribution or contact points on the backrest 12.

The microprocessor 4 is moreover connected to a camera interface 14 for capturing image data. The camera interface 14 has a camera 15 connected to it via a camera data line 16. The camera data line 16 may be configured as a data line for an analog camera signal or as a digital data line in this case.

The camera 15 in this case is arranged such that it captures the person sitting on the automobile seat 9. In particular, the camera 15 captures a head, an upper body region, a hip region and thighs of this sitting person in this case.

Moreover, the microprocessor 4 is connected to a display device interface 17 via which the microprocessor 4 can transmit information to be displayed. The display device interface 17 has the display device 2 connected to it via a display device data line 18, so that the display device 2 can receive the information to be displayed.

The display device 2 in this case is arranged such that it is in the field of view of the person sitting on the automobile seat 9 and can be seen by this person.

The center console 10 has a touch sensitive screen arranged in it as an input device 19 such that it can be operated by the sitting person, so that inputs from the sitting person can be captured. These inputs are forwarded to the control device 3. The input device 19 is to this end connected to an input data interface 20 via an input data line 21, the input data interface 20 being connected to the microprocessor 4.

A display data interface 22 is connected to the microprocessor 4. Via this display data interface 22, the microprocessor 4 can receive information to be displayed. A display data source 23 providing information to be displayed on the display device 2 is connected to the display data interface 22 via a display data line 24. In this case, the display data line 24 is used to transmit the information to be displayed to the display data interface 22. The display data source 23 is a component or apparatus of the motor vehicle or a computer on the internet for example.

The operation of the display control apparatus 1 is explained more precisely below.

An initial configuration of the display control apparatus 1 is explained below.

After a person has sat on the automobile seat 9, the person uses an input on the input device 19, which is transmitted to the control device 3, to trigger the initial configuration for capturing biometric data of the person and creating a profile of preferred display parameters. Such an initial configuration is not restricted to a first time of sitting in the automobile seat 9 in this case, but rather can be started afresh by the person at any time using the input device 19.

After the initial configuration is started, the pressure sensors 7 capture values for the weight force of the person that acts on them. These values are transmitted to the microprocessor 4 via the bus connection 8 and the pressure sensor interfaces 6. The microprocessor 4 combines these pressure values or weight values with one another, e.g. by adding them, so that a total weight of the person is ascertained.

Moreover, the camera 15 captures a camera image of the person sitting in the automobile seat 9. This camera image is transmitted in the form of image data from the camera 15 to the microprocessor 4 via the camera data line 16 and the camera interface 14. The microprocessor 4 can buffer-store the received image data on the memory device 5 for further processing.

The microprocessor 4 then performs an image analysis of the image data to capture biometric data of the person and to determine a distance of eyes of the person from the display device 2. During this image analysis, the microprocessor 4 extracts a face of the person from the image data and, from this extracted face, facial features, such as e.g. an interpupillary distance, a face geometry, etc., as biometric data. The extracted face and the extracted facial features are used to determine the distance of the eyes of the person from the display device 2. To this end, the image data transmitted by the camera 15 are evaluated so that an estimation of the distance is effected on the basis of the size ratio between the face of the person and the camera image. Such a method is disclosed in the cited EP 2 515 526 A2, for example.

The distance from the display device 2 in this case is influenced by the body posture, the position or setting of the automobile seat 9 in which the person is sitting and the position or arrangement of the display device 2. If the display device 2 is provided in a rear of another automobile seat (not shown), then the position or setting of said other automobile seat likewise exerts an influence on the distance from the display device 2.

The microprocessor 4 then uses the display device interface 17 and the display device data line 18 to output on the display device 2 a piece of information asking the person to stipulate preferred display parameters.

For capturing the preferred display parameters, a control panel is displayed on the input device 19 that can be used to set display parameters, e.g. using displayed slide controls, keys or input boxes.

The person uses the control panel to confirm that he wishes to input his preferred display parameters, and the microprocessor 4 then uses the display device 2 to display predetermined symbols and/or a predetermined text as an example of a displayed piece of information.

The person then uses the input device 19 to alter the display parameters of the display device 2. In this case, the microprocessor 4 changes the display parameters for the information displayed on the display device 2 as stipulated by the person using the input device 19 to set the display parameters, so that the person is provided with an immediate response to amended settings.

After the person has set the preferred display parameters and has confirmed them, the microprocessor 4 stores the biometric data of the person, that is to say the ascertained total weight and the extracted facial features, in the memory device 5 in combination with the preferred display parameters and the corresponding distance of the eyes from the display device 2.

Therefore, the display parameters preferred by the person are stored in the memory device 5 together with the biometric data of said person, so that the microprocessor 4 has access to the preferred display parameters associated with this person and can set them on the display device 2 in the event of the person being recognized by means of the stored biometric data. The corresponding distance of the eyes from the display device 2 is likewise stored and is used to match the preferred display parameters to be set to a changed distance of the eyes from the display device 2 or to correct said display parameters for a changed distance of the eyes from the display device 2.

A method for controlling a display device 2 in a motor vehicle is explained below. This method can be carried out using the display control apparatus 1 and is consistent with normal operation.

The method begins in step S1.

When a person sits in the automobile seat 9, the pressure sensors 7 transmit sensor values to the microprocessor 4. As a result, the microprocessor detects the presence of a person in the automobile seat 9 (step S2). While no person is detected in the automobile seat 9, the method can involve (actively) waiting for a person to sit.

The identification of the person then begins (step S3). To this end, the sensor values of the pressure sensors 7 and the camera image of the camera 15 are requested and received by the microprocessor 4, which, as explained above, extracts biometric data therefrom and compares said biometric data with the biometric data stored in the memory device 5.

If the person is recognized during such identification by means of comparison of the biometric data, then the microprocessor 4 accesses the preferred display parameters of this person in the memory device 5. If no person is recognized, then instead predetermined standardized display parameters, which have previously been ascertained by means of an empirical method, for example, are loaded from the memory device 5.

The identification process is not security-relevant or security-critical, since it merely involves identification of a person for the setting of display parameters. A false or incorrect identification of the person accordingly has no serious consequences. The identification can therefore be effected by means of simple parameters, i.e. performed using extremely simple sensors and methods.

If the person sitting in the automobile seat 9 uses the control panel displayed on the input device 19 to retrieve information that is to be displayed on the display device 2, or puts this into action, then the microprocessor 4 captures the body posture of the person in a next step by newly requesting the sensor values of the pressure sensors 7, and determines the distance of the eyes to the display device 2, as explained above (step S4). The requested pressure data together describe a weight distribution of the person sitting in the automobile seat 9. This weight distribution allows the body posture of the person to be inferred by means of an evaluation, as explained later on.

To evaluate the body posture, the microprocessor 4 moreover receives the camera image captured by the camera 15 showing the person sitting in the automobile seat 9, as already explained above.

The microprocessor 4 then performs an image analysis of the image data to capture the body posture of the person. During this image analysis, the microprocessor 4 extracts the body contour of the person from the image data by e.g. examining the image data for edges and/or for patterns. Therefore, the person is detected in the image data by virtue of his body contour being determined.

This body contour is then analyzed by the microprocessor 4 so that the orientation of a spinal column of a person is established approximately by virtue of the orientation or inclination of the body contour in the image data being analyzed. In a simple manner, it is possible for a shift in the upper body in the direction of the plane of the backrest 12 and/or an inclination of the upper body transversely with respect to the backrest 12 to be detected in this case. The inclination of the person toward the backrest 12 or away from the backrest 12 can be provided by means of estimation of a ratio of sizes between head and upper body or between head and image, similarly to during the case of the determination of the distance of the eyes from the display device 2 explained above, these body parts being determined from the body contour.

The captured body posture is then evaluated, which involves the microprocessor 4 using the ascertained weight distribution and/or the analysis of the body contour to assess whether a normotonic or a non-normotonic body posture is present (step S5). During the assessment by means of the weight distribution, the microprocessor 4 accomplishes this by comparing the individual sensor values of the pressure sensors 7 and the ascertained inclination values of the upper body with predetermined threshold values.

The weight distribution and/or inclinations of the upper body, or the applicable threshold values, which denote a normotonic body posture or a body posture in a normotonic range, can be previously ascertained empirically for this purpose.

Within the context of the present invention, a predetermined weight distribution of the person and/or a body posture with an approximately erect sitting position is/are assessed as a normotonic body posture. In the case of the weight distribution, the weight of the person is in particular distributed around a center of gravity of the person approximately uniformly longitudinally and transversely with respect to a direction of travel of the motor vehicle.

In this case, the weight distribution is substantially dependent on an orientation of a center of gravity of the person in relation to supporting surfaces via which the person is in contact with the automobile seat 9. The supporting surfaces of the automobile seat 9 are in this case typically the headrest 11, the backrest 12, the seating surface 13, the footrest 25 and the lower-leg support 26. The body parts of the person that come into contact with these supporting surfaces include the head, neck, nape, shoulders, back or upper body, hip, pelvis, bottom, undersides of thighs, undersides of lower legs and feet. The weight of the upper body means that the center of gravity of the person on the seating surface 13 is shifted in the direction of the backrest 12 of the automobile seat 9. The weight therefore primarily acts on the seating surface 13 via the bottom. Further larger components of the weight distribution are possessed by the thighs, the pelvis and the hip, the thighs pushing on the seating surface 13 and the pelvis and the hip pushing on the backrest 12.

In addition to the body parts being supported on the automobile seat 9, further body parts of the person can be supported on further supporting surfaces. These further body parts include arms and hands. In particular, the arms of the person can be supported on the armrest or the center console 10. The feet can also, instead of being supported on the footrest 25, be supported on a floor area (not shown) of the motor vehicle. This distributes part of the weight of the person over the further supporting surfaces.

In order to be able to ascertain the weight distribution as accurately as possible, it is therefore advantageous to measure the supported weight in as many supporting surfaces as possible, in particular that of the automobile seat 9, or with as many pressure sensors 7 as possible.

A stature or a body shape of the person also exerts an influence on the weight distribution. In this case, the stature comprises a height, a body size and a body weight. The body size, and in particular an abdominal girth, influences the distribution of the body weight on the seating surface 13 in this case. With a larger abdominal girth, a larger proportion of the body weight may be distributed toward a front edge of the seating surface 13 in this case, whereas a smaller abdominal girth or a slimmer stature involves a smaller proportion being distributed in this direction.

The stature and hence the weight distribution are also influenced by the sex of the person. The sex of the person plays a part insofar as often a female has a different geometry to her pelvis and bottom and a different mass distribution on the body than a male. Females often have a wider pelvis and hence also a wider bottom than males. This results in a different contact geometry and hence different pressure points on the seating surface 13 and the backrest 12 and also different pressure values. This results in a different weight distribution captured via the pressure sensors 7. Accordingly, the weight distribution of the person who has sat in the automobile seat 9 can be used to infer the sex of the person, so that this sex determination can also be used for identifying the person on the basis of the biometric data.

The weight distribution is in this case moreover dependent on a shape and in particular on an inclination of the seating surface 13 and the backrest 12. If the seating surface 13 has a greater inclination toward the backrest 12, then there is accordingly more weight on the section of the seating surface 13 adjacent to the backrest 12 than in the case of a less inclined seating surface 13. An increased inclination of the backrest 12 or of the seating surface 13 toward the backrest 12 also means that, when leaning against the backrest 12, an additional weight force acts on the backrest 12.

Likewise, the weight distribution is dependent on a selected position of the footrest 25 or of the lower-leg support 26. If the footrest 25 is in an approximately vertical position, then a larger weight force acts on the footrest 25 than on the lower-leg support 26. If the footrest 25 is moved into an approximately horizontal position, then a smaller weight force is exerted on the footrest 25 than on the lower-leg support 26.

Additionally, the weight distribution is also dependent on acceleration forces that typically occur in the motor vehicle, since an acceleration can move the upper body of the person. Accelerations normally occur briefly and alternately in this case, which means that they are eliminable by means of repeated ascertainment of the weight distribution, for example. The inclusion of other sensor values, such as an image sequence of the camera 15, speed values from speed sensors, acceleration values from acceleration sensors and/or rotation rates from wheel speed sensors, for example, also allows accelerations to be detected and to be eliminated during the ascertainment of the weight distribution.

The normotonic body posture with an approximately erect sitting position is a body posture in which the person sits in contact with the seating surface 13 and with the backrest 12 and with an approximately straight spinal column. In this case, contact with the seating surface 13 and with the backrest 12 means that the person is sitting in a relaxed manner and the body weight is distributed over multiple supporting surfaces. The approximately straight spinal column in this case makes it possible to infer that there is no one-sided weight distribution longitudinally and transversely with respect to the direction of travel of the motor vehicle.

In particular a forward-bent body posture, wherein there is no contact with the backrest 12, makes it possible to infer that the skeletal muscles are tense and therefore a normotonic body posture is not present. An angled, twisted or sideways, i.e. transversely with respect to the automobile seat 9, inclined body posture is also not consistent with a normotonic body posture.

After the evaluation of the body posture, the microprocessor 4 sets applicable display parameters on the display device 2 on the basis of the respective body posture and the current distance of the eyes from the display device 2 (step S6).

If the body posture is a normotonic body posture, then the microprocessor 4 sets display parameters that allow the person to read the display device 2 in fatigue-free fashion. Any distance differences between the current configuration and a previously determined and stored configuration are compensated for by means of adaptation of the display parameters. This is necessary if, by way of example, a front seat has had its position adjusted after the most recently stored configuration of the display parameters, for example for an occupant in the back, and hence, although a normotonic body posture has been able to be adopted, the viewing distance from the display has changed. As a result, the person has no reason to leave the normotonic body posture or to change the body posture, for example in order to be able to read the information depicted on the display device 2 more easily.

If a non-normotonic body posture of the person is established in step S5, however, then display parameters are set on the display device 2 that prompt the person to adopt a normotonic body posture.

After a predetermined waiting time has elapsed (step S7), this subsequently being referred to as the first waiting time, the microprocessor establishes whether operation needs to continue (step S8). If this is the case, then the microprocessor 4 again performs capture of the body posture with subsequent evaluation of the body posture (step S4). Otherwise, the method ends in step S9.

Alternatives to the display control apparatus 1 are explained below.

The control device 3 may be connected to position sensors or actuators of the automobile seat 9 or to other control devices that can be used to set a position of the automobile seat. This is used for capturing and/or for setting the position of the automobile seat 9, so that the position of the automobile seat 9 can be taken into consideration as well when the method is carried out and/or can be set by the control device 3 so that a normotonic body posture is quickly adoptable by the person.

Alternatively, only one pressure sensor 7 may be arranged in the backrest 12 and/or in the seating surface 13.

Optionally, more than one pressure sensor 7 may be arranged in the center console 10, the armrest, the headrest 11, the footrest 25 and/or the lower-leg support 26. The provision of multiple pressure sensors 7 in the headrest 11, the footrest 25 and/or the lower-leg support 26 is advantageous in particular if these are parts of a reclining seat, since then the weight distribution of the head, the feet and/or the lower legs of the person and hence the body posture of said person can be ascertained more accurately.

The center console 10, the armrest, the headrest 11, the footrest 25 and/or the lower-leg support 26 may also be configured without pressure sensors 7 arranged therein or can be omitted.

Further pressure sensors 7 may be arranged in the floor area of the motor vehicle, for example beneath or in a mat or a carpet or on an inner floor of the motor vehicle.

The pressure sensors 7 may also be individually connected to the pressure sensor interface 6 via single data lines.

These single data lines of the pressure sensors 7, the data lines 16, 18, 21, 24 and the bus connection 8 may also be configured as radio links with wireless data transmission.

Additionally, sensors that capture a weight and/or a geometry of the automobile seat 9, or apparatuses for setting the geometry of the automobile seat 9, may be connected to the control device 3. As a result, additional parameters can be captured that are taken into consideration as well during the ascertainment of the weight distribution. By way of example, for the purpose of identifying the person, the weight of the sitting person can be ascertained accurately from a total weight of the automobile seat 9 with the sitting person, since the net weight of the automobile seat 9 is known. Angles of inclination of the backrest 12 and the seating surface 13 and the distance of the automobile seat 9 from the display device 2 can be ascertained from the geometric data of the automobile seat 9 or the settings performed on the geometry of the automobile seat 9.

Optionally, sensor values of other sensors can be used for capturing or evaluating the body posture, determining distance, for capturing the biometric data and/or capturing the response by means of an input. The sensors for capturing the body posture in this case comprise not only the camera 15 but also a laser scanner, a radar appliance, an ultrasonic appliance and/or a microwave appliance, these sensors generating 3D data that are evaluated by the microprocessor 4. These 3D data can also be used to determine the distance of the eyes of the person from the display device 2 and/or to capture biometric data of the person, such as e.g. a face geometry, an ear geometry, a body shape, a body contour and/or a body size. The camera 15 and/or the laser scanner can moreover be used to capture an iris and/or a retina of the person and hence to identify the person. A further sensor for identifying the person is a microphone for detecting a voice or a fingerprint sensor for capturing a fingerprint.

Additionally, the input device 19 configured as a touch sensitive screen can also be used as a further display device, similarly to the display device 2, for depicting information to be displayed. For this purpose, the touch sensitive screen is connected to the display device interface 17 via a further display device data line (not shown), as is the case with the display device 2 with the display device data line 18.

The input device 19 may also be configured as a keypad, one or more control knobs or as a microphone for a voice input.

Alternatives to the operation of the display control apparatus 1 and of the method described above are explained below.

The initial configuration can also be omitted, and hence so too can the capture of the biometric data. Instead of storing the display parameters preferred by the person, it is then possible for standard values predetermined by the microprocessor 4 to be set on the display device 2, these having previously been ascertained empirically.

The identification of a person on the basis of the biometric data can also be effected automatically if a person wishes to have information displayed.

The microprocessor 4 can buffer-store the information to be displayed from the display data source 23 in the memory device 5 until it displays it on the display device 2.

Alternatively, the microprocessor 4 can also access image data buffer-stored in the memory device 5 that reproduce the sitting position currently adopted by the person and have been captured a very short time ago. To check whether these image data are new, a time stamp is stored in combination with the image data and is used via the microprocessor 4 to ascertain the age of the image data.

If, during the identification attempt in step S3, it is established that the person cannot be identified because there are no biometric data available for this person, then the initial configuration can also be started automatically. The reason is that in this case there is likewise no profile of preferred display parameters available.

Fundamentally, the determination of the distance of the eyes of the person from the display device 2 during the initial configuration and in step S4 can also be omitted. The display parameters set in step S6 are then not set on the basis of the distance. As a result, the setting of the display parameters is performed less precisely, however, since the distance of the eyes from the display device 2 is not taken into consideration.

The determination of the distance of the eyes of the person from the display device 2 and the capture of facial features as biometric data during the initial configuration and also the determination of the distance of the eyes of the person from the display device 2 and the capture of the body posture during normal operation do not have to be carried out in the order explained above, but rather the order in which they are carried out can also be changed.

When the method is carried out or during normal operation, the distance of the eyes of the person from the display device 2 can also be determined, rather than in step S4, in one other of steps S5 and S6. This needs to be done before the display parameters are set, however, so that the distance can be taken into consideration as well during this setting.

Fundamentally, the distance of the eyes of the person from the display device 2 can also be determined in a different manner than using the estimation by means of a comparison of the face size and the image size explained above. Further options for distance determinations are specified in the prior art cited above.

If the first waiting time has elapsed and the new evaluation of the body posture reveals that the person continues not to adopt a normotonic body posture, then the microprocessor 4 can set display parameters that are consistent with this non-normotonic body posture and/or the current distance of the eyes of the person from the display device 2 in order to allow the displayed information to be easily readable. The microprocessor 4 then blocks the attempt to bring the person into a normotonic body posture by setting applicable display parameters, either permanently or for a second waiting time. The second waiting time is in this case preferably selected to be much longer than the first waiting time explained above, in order to avoid a stress situation or fatigue as a result of continually changing display parameters or as a result of a display device 2 that is difficult to read or discern in the current sitting position.

The displayed information may be a selection from the information to be displayed. The selection of the displayed information from the potentially displayable information allows the volume of information depicted on the display device 2 to be decreased. This allows magnification of the respective displayed information for a given screen size or resolution and increases the readability of the display device 2. The selection can be made in this case on the basis of a determination of the relevance of the information.

If, by way of example, a web page is to be depicted that has multiple "frames" that each include different information to be depicted, the frame having the most relevant information can be determined and only this frame can be displayed in a browser on the display device 2. As a result, frames having less relevant information, such as advertising banners, advertisements, etc., for example, can be omitted. Therefore, the display device 2 can be used almost entirely for displaying the frame having the most relevant information.

When at least one further display device (not shown) is present, the setting of the display parameters can also comprise the distribution of the information to be depicted between the display device 2 and the at least one further display device according to predetermined rules and/or on the basis of the distance of the eyes from the respective display device, for which purpose the distances between the eyes of the person and each of the further display devices are determined.

The information to be displayed can in this case be distributed such that different components of information are depicted on different display devices. A reduced volume of information to be displayed means that this allows said information to be depicted on the respective display device in magnified fashion, so that readability can be improved.

The distribution of the information to be displayed over different display devices can be effected, and performed automatically, on the basis of an information content, an information type, a relevance of the respective information, according to a predetermined priority of available display devices and/or the technical properties or technical limitations thereof in this case. It is also possible for preferences for distribution of the information to be prescribed by the person viewing. As a result, the information to be displayed can be depicted on the different display devices with optimum readability. By way of example, information having a high level of relevance can be displayed on a display device having a high priority, while information of only minor significance is depicted on another display device having a low priority. Preferably, the display device 2 has a high assigned priority in this case, while other display devices are provided with lower priorities.

As a result of technical properties and limitations of the respective display device being taken into consideration as well, it is possible, by way of example, for a dynamically changing piece of information, such as moving pictures or a film, to be depicted on a sufficiently fast display device, while a relatively static piece of information, such as a text, is depicted on a rather sluggish display device.

The determination of the distances from the display device 2 and from the other display devices allows the display device that is arranged closer to the eyes of the person to display the most relevant component of information. The greater proximity allows one or more pieces of information to be displayed with simultaneously good readability or detectability. Less relevant components of information are then depicted on one or more of the other display devices that are further away. By way of example, when a film is being viewed, the display device arranged closest can display the film while supplementary information pertaining to the film is depicted on another display device, which is further away. A further example is viewing a web page that has frames, as explained above. The frame having the most relevant information is depicted on the display device arranged closest, while frames having less relevant information are displayed on other display devices, which are further away. This allows good readability to be achieved on the respective display device, all of the information being visible to the person at the same time.

When the body posture of the person changes, with the distances likewise changing, the distribution of the information to be displayed over the different display devices can be changed. If, by way of example, the person leans in a direction in which his eyes come closer to another display device than to the display device having the most relevant information, or if he gets too close to the display device having the most relevant information, then the most relevant information can be depicted on the other or on another display device. This can be detected on the basis of the distances of (possibly predetermined) threshold values being transgressed either way. In order to avoid constant switching to and fro or movement of the information between different display devices in the event of small distance changes, it is expedient to stipulate the threshold values such that the respective changeover process is provided with a hysteresis.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE SYMBOLS

1 Display control apparatus
2 Display device
3 Control device
4 Microprocessor
5 Memory device
6 Pressure sensor interface
7 Pressure sensor
8 Bus connection
9 Automobile seat
10 Center console
11 Headrest
12 Backrest
13 Seating surface
14 Camera interface
15 Camera
16 Camera data line
17 Display device interface
18 Display device data line
19 Input device
20 Input data interface
21 Input data line
22 Display data interface
23 Display data source
24 Display data line
25 Footrest
26 Lower-leg support

What is claimed is:

1. A method for controlling a display device in a motor vehicle, wherein the method comprises the acts of:
capturing biometric data of a person using one or more sensors in the motor vehicle;
determining an eye distance as between the eyes of the person and the display device;
creating a profile of preferred display parameters, wherein the profile is associated with the person, and wherein the display parameters are settable on the display device to define visible characteristics of images displayed by the display device;
storing the profile of the preferred display parameters in combination with the captured biometric data and the determined eye distance; and
actuating the display device, in response to the determined eye distance and in accordance with the stored biometric data and the eye distance, so as to set the stored preferred display parameters on the display device.

2. The method as claimed in claim 1, wherein the profile of preferred display parameters is created by displaying different display images on the display device and capturing a response of the person.

3. The method as claimed in claim 2, wherein the response is captured by at least one of:
an input of an input device, wherein the input device comprising at least one of a keypad, one or more control knobs, a touch sensitive screen, and a microphone, and
one or more sensors capturing a body posture of the person.

4. The method as claimed in claim 1, the method further comprises:
determining whether the person adopts a normotonic body posture; and
storing a profile of currently set display parameters, as the profile of preferred display parameters, in combination with the captured biometric data of the person if it is determined that the person adopts the normotonic body posture.

5. The method as claimed in claim 1, further comprising:
monitoring to determine whether the person adopts the normotonic body posture;
determining a level of normotonia of the body posture if the person adopts the normotonic body posture; and
storing the profile of the currently set display parameters, as the profile of preferred display parameters, in combination with the captured biometric data of the person together with the level of normotonia only if the level of normotonia exceeds a previously-stored level of normotonia of another profile of display parameters of the person or no other profile of display parameters of the person has previously been stored.

6. The method as claimed in claim 1, the method further comprises:
capturing biometric data of the person using the one or more sensors and identifying the person on the basis of previously-stored biometric data;
determining a current distance between eyes of the identified person and the display device; and
adapting the preferred display parameters stored in combination with the biometric data of the identified person based on a disparity between the stored distance and the current distance and setting display parameters matched to the current distance on the display device.

7. The method as claimed in claim 1, wherein the method further comprises:
  capturing biometric data of the person using the one or more sensors and identifying the person based on previously-stored biometric data,
  setting display parameters linked to the identified person on the display device.

8. A method for controlling a display device in a motor vehicle, wherein the method comprises:
  capturing a body posture of a person using one or more sensors in the motor vehicle;
  determining, based on captured body posture, that the person is in a normotonic body posture;
  determining a distance between eyes of the person and the display device if in response to determining that the person is in the normotonic body posture; and
  setting predetermined display parameters on the display device based on the determined distance between the eyes and the display device, wherein the predetermined display parameters are settable to define visible characteristics of images displayed on the display device.

9. The method as claimed in claim 8, wherein the predetermined display parameters are set based on the determined distance between the eyes and the display device and in combination with stored preferred display parameters for the person.

10. The method as claimed in claim 8, further comprising altering display parameters such that the person is influenced so as to adopt the normotonic body posture.

11. The method as claimed in claim 10, further comprising monitoring to determine whether the person adopts the normotonic body posture, wherein the altered display parameters are stored as set display parameters if adoption of the normotonic body posture is determined.

12. The method as claimed in claim 8, further comprising determining a weight distribution of the person, wherein the weight distribution is taken into account when determining whether the person is in the normotonic body posture.

13. The method as claimed in claim 12,
  further comprising assessing, as the normotonic body posture, at least one of a predetermined weight distribution of the person an a body posture with an approximately erect sitting position,
  wherein the predetermined weight distribution corresponds to a weight of the person being distributed approximately uniformly around a center of gravity of the person longitudinally and transversely with respect to a direction of travel of the motor vehicle.

14. The method as claimed in claim 12, wherein sensors for determining the weight distribution are configured as at least two pressure sensors arranged in an automobile seat, a seating surface, backrest, headrest, center console, armrest, interior lining, lower-leg support, footrest and/or in a floor area of the motor vehicle,
  wherein the one or more sensors for capturing the body posture comprises a camera, a laser scanner, a radar appliance, an ultrasonic appliance and/or a microwave appliance.

15. The method as claimed in claim 12, further comprising capturing and taking into consideration further sensor values for determining if the person is in the normotonic body posture, wherein the further sensor values include at least one:
  sensor values from a camera used to capture at least a face of the person, wherein a facial expression of the person is extracted from the camera data and a level of relaxation of the person is determined on the basis of the facial expression, where persons have a high level of relaxation in the normotonic body posture;
  sensor values from a camera used to capture at least an eye area of the person, wherein an eye geometry of the person is extracted from the camera data and a degree of eye opening and/or an eye strain of the person is determined on the basis of the eye geometry, wherein persons have an average degree of eye opening and/or a low eye strain in the normotonic body posture;
  sensor values from a camera, a laser scanner, a radar appliance, an ultrasonic appliance and/or a microwave appliance used to determine a breathing rate of the person and a level of relaxation of the person is determined on the basis of the breathing rate, where persons have a low breathing rate and high level of relaxation in the normotonic body posture; and
  sensor values from a heart rate monitor configured as a pulsimeter, a radar appliance, an ultrasonic appliance and/or a microwave appliance used to determine a pulse of the person and a level of relaxation of the person is determined on the basis of the pulse, where persons have a low pulse and hence high level of relaxation in the normotonic body posture.

16. The method as claimed in claim 12, further comprising determining a level of normotonia for the normotonic body posture using sensor values captured in connection with determining the normotonic body posture, wherein the sensor values are weighted according to predetermined rules and combined with one another.

17. The method as claimed in claim 8, wherein at least one further display device is present, distances between eyes of a person and each further display device are determined and a piece of information to be displayed is distributed between the display device and the further display device according to predetermined rules and/or based on the distance between the eyes and the display device and the further display device, respectively.

18. An apparatus configured to control a display device in a motor vehicle, the apparatus comprising a control device that is connected to the display device and to one or more sensors, and wherein the control device is configured to:
  capture biometric data of a person using the one or more sensors in the motor vehicle;
  determine an eye distance as between the eyes of the person and the display device;
  create a profile of preferred display parameters, wherein the profile is associated with the person, and wherein the display parameters are settable on the display device to define visible characteristics of images displayed by the display device;
  store the profile of the preferred display parameters in combination with the captured biometric data and the determined eye distance; and
  actuate the display device, in response to the determined eye distance and in accordance with the stored biometric data and the eye distance so as to set the stored preferred display parameters on the display device.

19. The method of claim 1, wherein said visible characteristics of display images comprises one or more of a brightness, a contrast, a color, a color scheme, a color temperature, a resolution, an image size, a font size, a font style, a symbol size, a display area size, a display window size, a display window arrangement, a scaling factor, and a selection of displayed information from potentially displayable information.

* * * * *